United States Patent
Kakuno et al.

(10) Patent No.: US 8,090,585 B2
(45) Date of Patent: Jan. 3, 2012

(54) AUDIO DECODING DEVICE

(75) Inventors: Hideyuki Kakuno, Osaka (JP); Naoki Shindo, Osaka (JP)

(73) Assignee: Panasonic Corporation, Osaka (JP)

( * ) Notice: Subject to any disclaimer, the term of this patent is extended or adjusted under 35 U.S.C. 154(b) by 1183 days.

(21) Appl. No.: 11/822,907

(22) Filed: Jul. 11, 2007

(65) Prior Publication Data

US 2008/0086312 A1   Apr. 10, 2008

(30) Foreign Application Priority Data

Oct. 6, 2006 (JP) ................................. 2006-275276

(51) Int. Cl.
*G10L 19/00* (2006.01)
*G10L 21/00* (2006.01)
(52) U.S. Cl. .......................... 704/500; 704/201; 700/94
(58) Field of Classification Search .......... 704/500–504, 704/201; 700/94
See application file for complete search history.

(56) References Cited

U.S. PATENT DOCUMENTS

| | | | |
|---|---|---|---|
| 5,852,800 A * | 12/1998 | Modeste et al. | 704/270.1 |
| 5,925,146 A | 7/1999 | Murata et al. | |
| 2003/0039366 A1 * | 2/2003 | Eid et al. | 381/27 |
| 2003/0125933 A1 * | 7/2003 | Saunders et al. | 704/201 |
| 2005/0058304 A1 | 3/2005 | Baumgarte et al. | |
| 2006/0029140 A1 | 2/2006 | Shinsho | |
| 2007/0225840 A1 | 9/2007 | Yahata et al. | |

FOREIGN PATENT DOCUMENTS

| | | |
|---|---|---|
| JP | 05-110528 | 4/1993 |
| JP | 10-209977 | 8/1998 |
| JP | 2006-050476 | 2/2006 |
| WO | WO 01/58064 A1 | 8/2001 |
| WO | WO 2006/088145 A1 | 8/2006 |

OTHER PUBLICATIONS

Breebaart, J., et al., "MPEG Spatial Audio Coding/MPEG Surround: Overview and Current Status", Audio Engineering Society Convention Paper, pp. 1-17, Oct. 2005, New York NY USA.
Japanese Office Action, with English translation, issued in Japanese Patent Application No. JP 2006-275276, mailed Oct. 7, 2008.
Digital TV Group, "Digital Terrestrial Television Requirements for Interoperability Issue 4.0" (section 4.5 Audio description), Jan. 11, 2005.

* cited by examiner

*Primary Examiner* — Angela A Armstrong
(74) *Attorney, Agent, or Firm* — McDermott Will & Emery LLP

(57) ABSTRACT

An audio decoding device comprises an audio decoding section for decoding first stream data and second stream data to generate two pieces of audio data and a data processing parameter, an external setting section in which a parameter corresponding to the data processing parameter is set, and an audio data processing section for processing the two pieces of audio data. When the data processing parameter contained in the second stream data is inappropriate, the audio data processing section performs data processing using the parameter set in the external setting section. When the data processing parameter contained in the second stream data is appropriate, the audio data processing section performs data processing using the data processing parameter generated by the audio decoding section.

6 Claims, 9 Drawing Sheets

FIG. 2

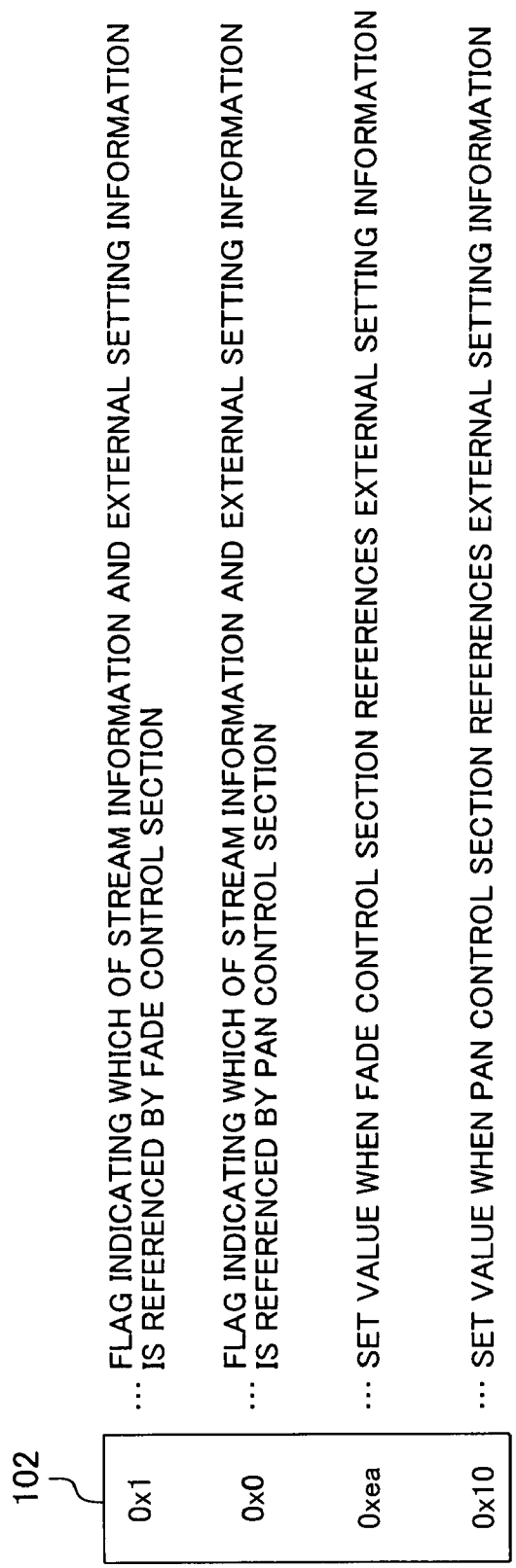

102

0x1 ... FLAG INDICATING WHICH OF STREAM INFORMATION AND EXTERNAL SETTING INFORMATION IS REFERENCED BY FADE CONTROL SECTION

0x0 ... FLAG INDICATING WHICH OF STREAM INFORMATION AND EXTERNAL SETTING INFORMATION IS REFERENCED BY PAN CONTROL SECTION

0xea ... SET VALUE WHEN FADE CONTROL SECTION REFERENCES EXTERNAL SETTING INFORMATION 0x10 ... SET VALUE WHEN PAN CONTROL SECTION REFERENCES EXTERNAL SETTING INFORMATION

US 8,090,585 B2

AUDIO DECODING DEVICE

CROSS REFERENCE TO RELATED APPLICATIONS

This Non-provisional application claims priority under 35 U.S.C. §119(a) on Patent Application No. 2006-275276 filed in Japan on Oct. 6, 2006, the entire contents of which are hereby incorporated by reference.

BACKGROUND OF THE INVENTION

1. Field of the Invention

The present invention relates to an audio decoding device for decoding stream data containing encoded audio data.

2. Description of the Related Art

Some digital television broadcasting services (e.g., in Europe or the like) use stream data containing encrypted main audio (stereo), and in addition, stream data containing encrypted auxiliary audio used for explanation of a broadcast content.

A device for receiving the digital television broadcast combines main audio data (stereo) and auxiliary audio data obtained by decoding these stream data before outputting them. In this case, if the main audio data and the auxiliary audio data are simply combined, the loudness becomes larger than necessary, which is not comfortable for listening. Therefore, it is necessary to reduce the loudness of the main audio data to some extent before combination so as to obtain an appropriate loudness after combination. Also, if the sound localization of the auxiliary audio data can be controlled, it is convenient for listeners.

Therefore, the stream data of the auxiliary audio data contains parameters for processing the main audio data and the auxiliary audio data to adjust the relationship in loudness between the main audio data and the auxiliary audio data, and controlling the sound localization of auxiliary audio. An audio decoding device for decoding these stream data uses the parameters to adjust the loudness and control the sound localization (e.g., Digital TV Group, "Digital Terrestrial Television Requirements for Interoperability Issue 4.0" (Section 4.5 Audio description), Jan. 11, 2005).

However, the parameter may be altered into an inappropriate value, depending on the reception conditions. In such a case, the loudness cannot be appropriately adjusted, for example.

SUMMARY OF THE INVENTION

In view of the above-described problem, the present invention is attained. An object of the present invention is to provide an audio decoding device which can appropriately perform data processing (e.g., loudness adjustment, etc.) even if a parameter for the data processing which is contained in stream data has an appropriate value.

To solve the above-described problem, an embodiment of the present invention is an audio decoding device for decoding stream data containing encoded audio data. The audio decoding device receives first stream data containing encoded data obtained by encoding first audio data, and second stream data containing encoded data obtained by encoding second audio data and a data processing parameter for processing the first audio data and the second audio data. The device comprises an audio decoding section for decoding the first stream data and the second stream data to generate the first and second audio data and the data processing parameter, an external setting section in which a parameter corresponding to the data processing parameter is set, and an audio data processing section for processing the first and second audio data. The audio data processing section processes at least one of the first and second audio data using the parameter set in the external setting section when the data processing parameter contained in the second stream data is inappropriate, and using the data processing parameter generated by the audio decoding section when the data processing parameter contained in the second stream data is appropriate.

BRIEF DESCRIPTION OF THE DRAWINGS

FIG. 2 is a diagram showing an exemplary content described in an external setting section 102.

DETAILED DESCRIPTION OF THE PREFERRED EMBODIMENTS

Figure 1:
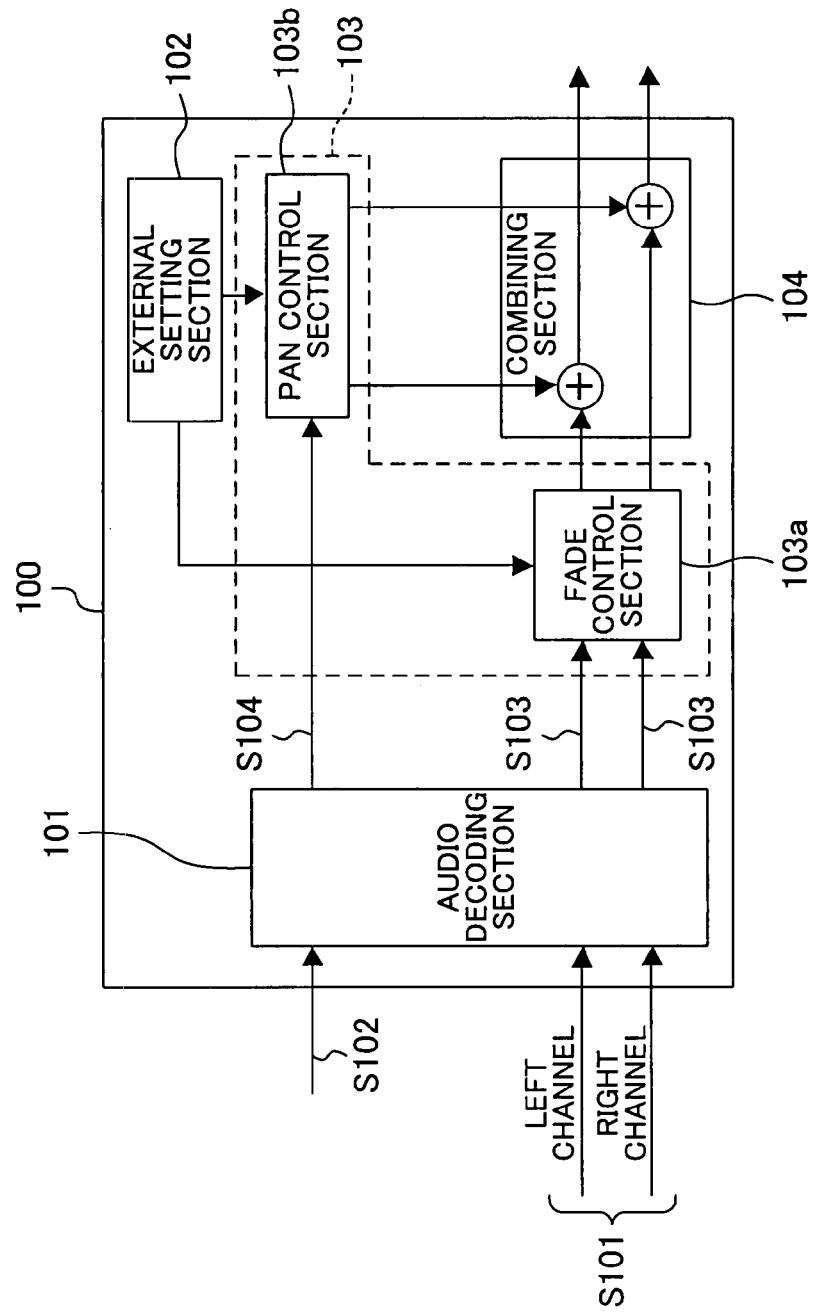
FIG. 1 is a block diagram showing a configuration of an audio decoding device 100 according to Embodiment 1 of the present invention.

Embodiments and variations hereinafter described are for illustrating audio decoding devices for decoding and outputting audio information in digital television broadcasting. Each audio decoding device receives two kinds of audio stream data (hereinafter simply abbreviated as stream data), decodes each piece of stream data, combines the pieces of decoded audio data, and outputs the result.

One of the two kinds of stream data is stream data (referred to as first stream data S101) containing main audio data of a digital television broadcast. In each embodiment below, the main audio data is input through two channels (a left channel and a right channel (stereo)).

The other stream data is stream data (referred to as second stream data S102) containing auxiliary audio data of a digital television broadcast, which is used for the purpose of explanation of the broadcast content, for example.

If the main audio data obtained by decoding the first stream data S101 and the auxiliary audio data obtained by decoding the second stream data S102 are simply combined, the loudness of the combined data becomes larger than necessary. To avoid this, the loudness of the main audio data may be previously reduced so as to obtain an appropriate loudness of the combined audio. Also, it is convenient for listeners to be able to control the sound localization of the auxiliary audio data.

Therefore, stream information for processing the main audio data and the auxiliary audio data is contained in the second stream data S102. The stream information contains two parameters (referred to as data processing parameters).

One of the data processing parameters is a parameter referred to as "fade". A fade value is a parameter which indicates how much the loudness of the main audio data is reduced before the main audio data and the auxiliary audio data are combined. The other data processing parameter is a parameter referred to as "pan". A pan value is a parameter which is used to control the sound localization of the auxiliary audio.

An example of the first stream data S101 and the second stream data S102 is "main program data" and "audio description data", which are used in digital broadcasting standards which are defined in "Digital Terrestrial Television Requirements for Interoperability Issue 4.0" by "Digital TV Group", which is an industry association in the UK.

Hereinafter, embodiments and variations of the present invention will be described with reference to the accompanying drawings. Note that like parts are indicated by like reference numerals throughout the specification and will not be repeatedly described.

Embodiment 1 of the Invention

FIG. 1 is a block diagram showing a configuration of an audio decoding device 100 according to Embodiment 1 of the present invention. As shown in FIG. 1, the audio decoding device 100 comprises an audio decoding section 101, an external setting section 102, an audio data processing section 103, and a combining section 104.

The audio decoding section 101 outputs first decoded data S103 obtained by decoding first stream data S101 and second decoded data S104 obtained by decoding second stream data S102. The first stream data S101 contains two channels (a left channel and a right channel) of main audio data (stereo), and therefore, the first decoded data S103 are also 2-channel stereo data. On the other hand, the second decoded data S104 obtained by decoding the second stream data S102 contains one channel of auxiliary audio data, and in addition, a fade value and a pan value.

The external setting section 102 can set a value corresponding to a fade value and a value corresponding to a pan value (these values are referred to as external setting information). The external setting information is set in the external setting section 102 by a user (e.g., a person who designs a television broadcast receiver or the like using this device, a person who views and listens to a broadcast using a television broadcast receiver or the like in which this device is incorporated).

Also, in the external setting section 102, a fade value selection flag which indicates which of the fade value contained in the second decoded data S104 and the fade value set in the external setting section 102 is used for the loudness adjustment, and a pan value selection flag which indicates which of the pan value contained in the second decoded data S104 and the pan value set in the external setting section 102 is used for the sound localization control, are set. For example, these flags may be rewritten with a predetermined value (e.g., 0x1 when appropriate and 0x0 when inappropriate), depending on the result of detection by an error detecting section (not shown) of whether or not the fade value in the second stream data S102 or the like is inappropriate (error). FIG. 2 shows an exemplary content described in the external setting section 102.

The audio data processing section 103 comprises a fade control section 103a and a pan control section 103b, and processes the main audio data and the auxiliary audio data. Specifically, processes performed by the audio data processing section 103 in this embodiment include a control of a relationship in loudness between the main audio data and the auxiliary audio data, and a control of sound localization of the auxiliary audio data.

The fade control section 103a selects any one of the fade value contained in the second decoded data S104 and the fade value contained in the external setting section 102, depending on the value of the fade value selection flag, and uses the selected value to adjust the loudness of the main audio data (specifically, the loudness is reduced by a predetermined amount (hereinafter referred to as a fade control)). Specifically, if the fade value in the received second stream data S102 or the like is inappropriate, the fade value in the external setting section 102 is used for the fade control, and if otherwise, the fade value contained in the second decoded data S104 is used for the fade control.

The pan control section 103b selects any one of the pan value contained in the second decoded data S104 and the pan value contained in the external setting section 102, depending on the value of the pan value selection flag, and uses the selected value to control the sound localization of the auxiliary audio data (hereinafter referred to as a pan control). Specifically, if the pan value in the received second stream data S102 or the like is inappropriate, the pan value in the external setting section 102 is used for the pan control, and if otherwise, the pan value contained in the second decoded data S104 is used for the pan control. Note that the output of the pan control section 103b is 2-channel stereo data. The loudness adjustment or the sound localization control using the fade value or the pan value in the external setting section 102 is referred to as error recovery.

The combining section 104 combines an output of the fade control section 103a and an output of the pan control section 103b and outputs the result.

(Operation of Audio Decoding Device 100)

In the audio decoding device 100, when the error detecting section detects that any of the fade value and the pan value in the second stream data S102 is inappropriate, the value of a flag corresponding to the inappropriate parameter in the external setting section 102 is set to be a value indicating that the parameter is inappropriate.

On the other hand, the audio decoding section 101 decodes the input first stream data S101 and second stream data S102 and outputs the first decoded data S103 and the second decoded data S104, respectively.

When the fade value selection flag indicates that the fade value in the second stream data S102 is inappropriate, the fade control section 103a reads out a fade value from the external setting section 102, and adjusts the loudness of the main audio data based on the fade value thus read out. When the fade value selection flag indicates that the fade value in the second stream data S102 is appropriate, the fade control section 103a adjusts the loudness of the first decoded data S103 based on the fade value in the second decoded data S104.

Similarly, when the pan value selection flag indicates that the pan value in the second stream data S102 is inappropriate, the pan control section 103b reads out a pan value from the external setting section 102, and controls the sound localization of the auxiliary audio data based on the pan value thus read out. When otherwise, the pan control section 103b controls the sound localization of the auxiliary audio data based on the pan value in the second decoded data S104.

As described above, according to this embodiment, even when the fade value or the pan value in the second stream data S102 is inappropriate, the value set in the external setting section 102 is used to perform the loudness adjustment and the sound localization control, thereby guaranteeing an appropriate audio output.

(Variation 1 of Embodiment 1 of the Invention)

Figure 3:
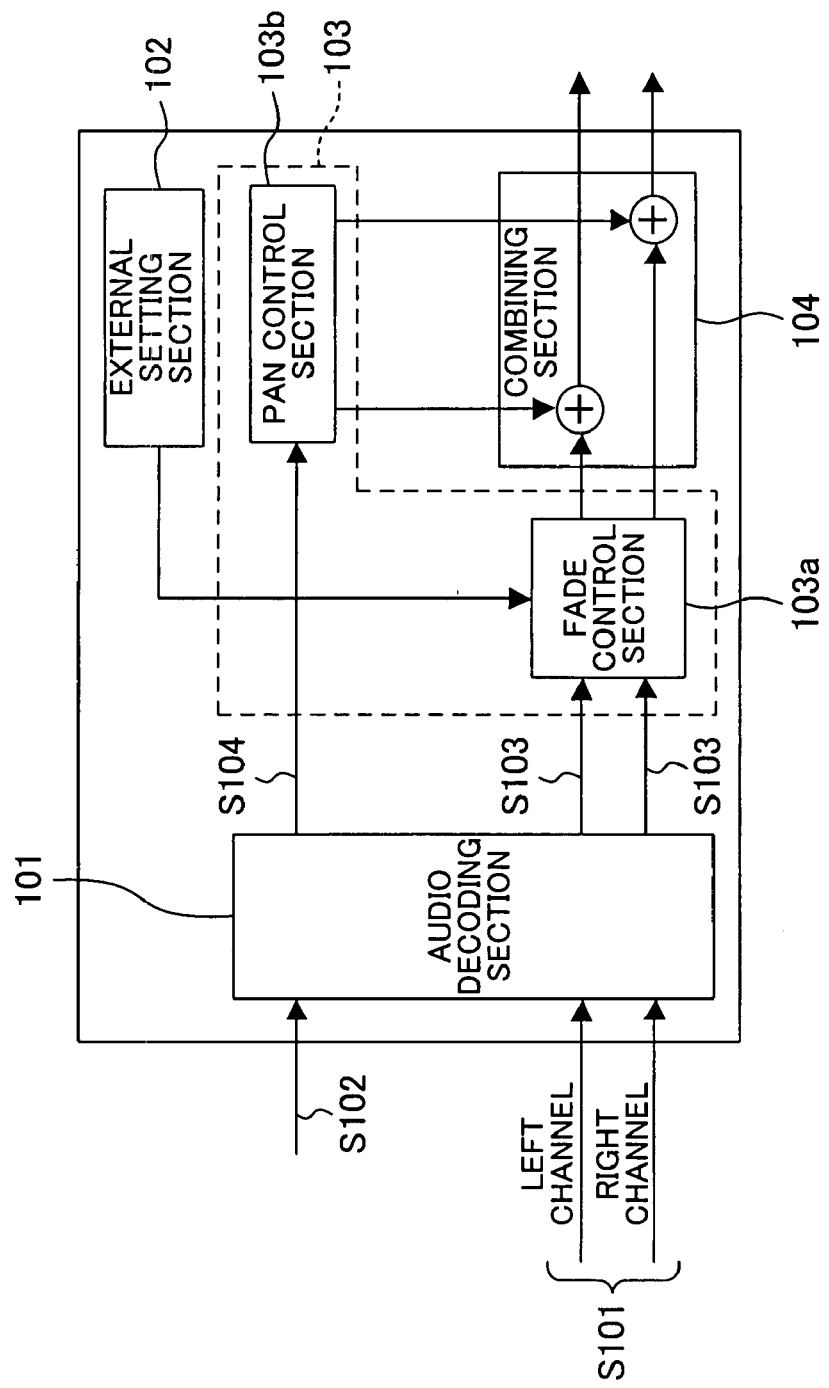
FIG. 3 is a block diagram showing a configuration of an audio decoding device according to Variation 1 of Embodiment 1 of the present invention.

FIG. 3 is a block diagram showing a configuration of an audio decoding device according to Variation 1 of Embodiment 1 of the present invention. In this audio decoding device, the pan control section 103b is adapted to invariably reference the pan value in the second decoded data S104 during the sound localization control. For example, in an area where monaural broadcasts are dominant, the sound localization control is mostly not required. Therefore, the pan control section 103b may be configured as in this variation, in a device for an area where monaural broadcasts are dominant. Note that, even in this variation, when the fade value in the second stream data S102 is inappropriate, a fade control is performed using a value set in the external setting section 102.

(Variation 2 of Embodiment 1 of the Invention)

Figure 4:
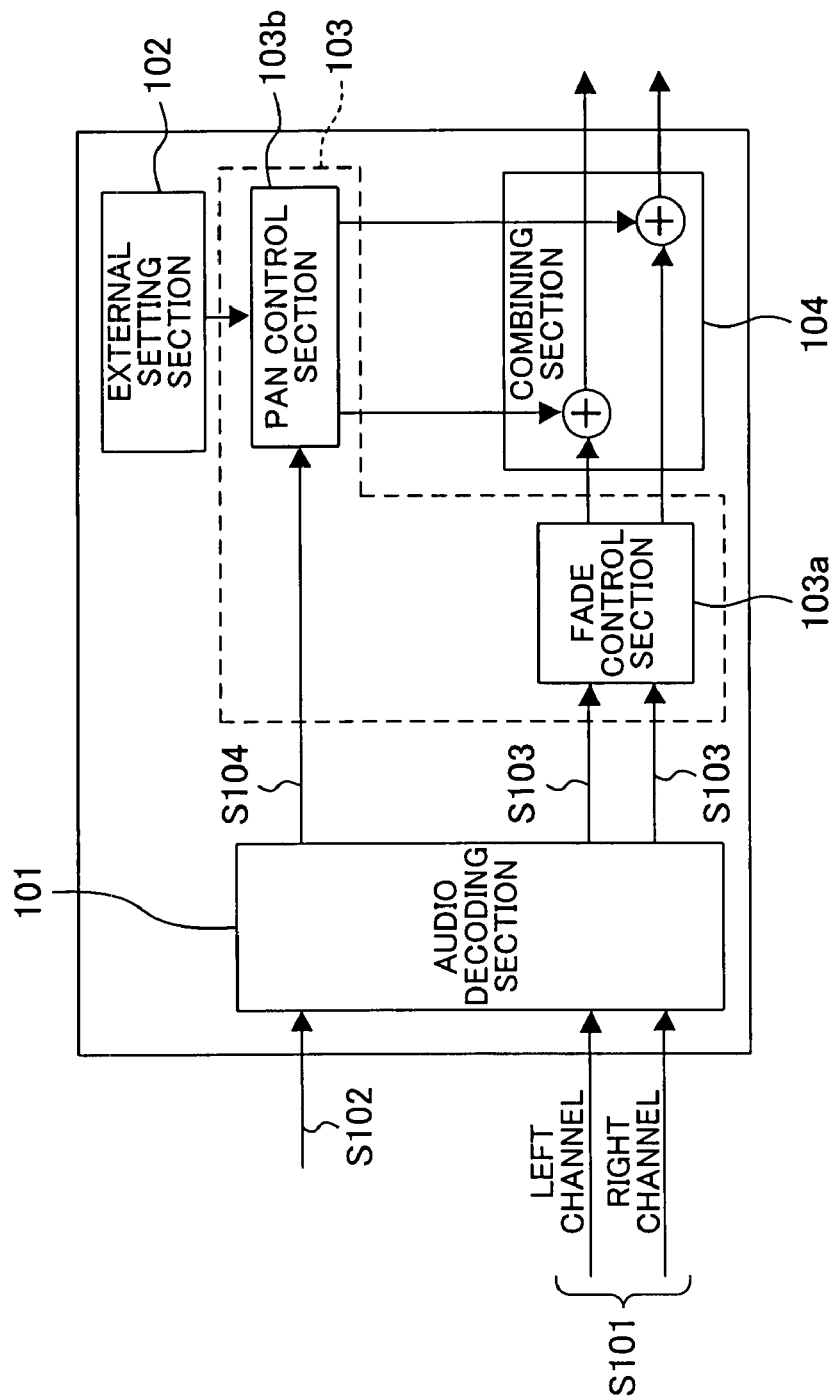
FIG. 4 is a block diagram showing a configuration of an audio decoding device according to Variation 2 of Embodiment 1 of the present invention.

FIG. 4 is a block diagram showing a configuration of an audio decoding device according to Variation 2 of Embodiment 1 of the present invention. In this audio decoding device, the fade control section 103a is adapted to invariably reference the fade value in the second decoded data S104 during the loudness control. Note that, also in this variation, when the pan value in the second stream data S102 is inappropriate, a value set in the external setting section 102 is used to perform the pan control.

Embodiment 2 of the Invention

Figure 5:
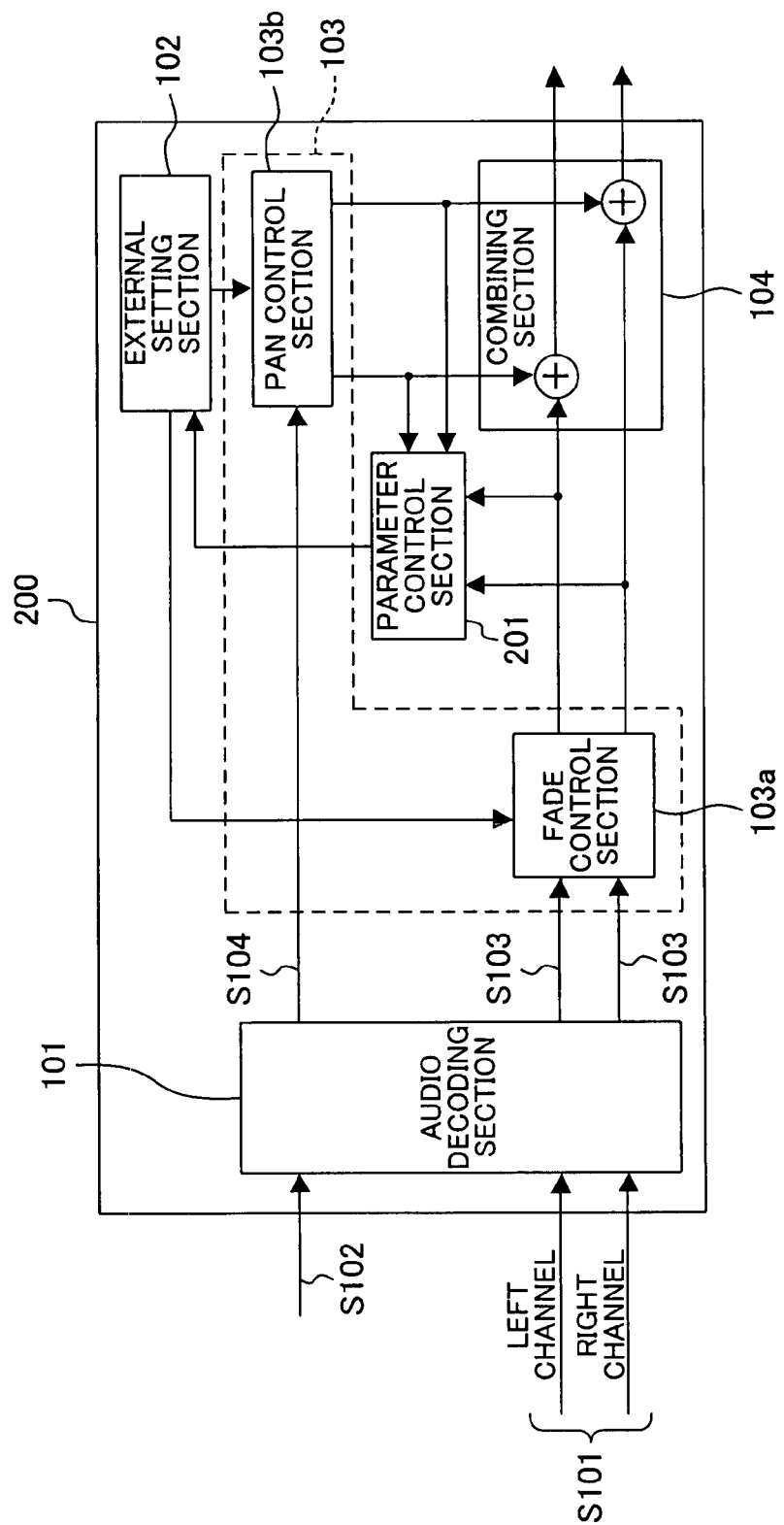
FIG. 5 is a block diagram showing a configuration of an audio decoding device 200 according to Embodiment 2 of the present invention.

FIG. 5 is a block diagram showing a configuration of an audio decoding device 200 according to Embodiment 2 of the present invention. As shown in FIG. 5, the audio decoding device 200 is obtained by adding a parameter control section 201 to the audio decoding device 100.

The parameter control section 201 sets a fade value and a pan value in the external setting section 102, depending on an output of the fade control section 103a and an output of the pan control section 103b. For example, the parameter control section 201 determines and sets a fade value in the external setting section 102 so that the amplitude of an output of the fade control section 103a when the loudness adjustment is performed using the fade value in the external setting section 102 is not significantly different from that when the loudness adjustment is performed using an appropriate fade value in the second decoded data S104.

Further, the parameter control section 201 determines and set a pan value in the external setting section 102 so that the locations of sounds when the sound localization is controlled using the pan value in the external setting section 102 are not significantly different from those when the sound localization is controlled using an appropriate pan value in the second decoded data S104.

Therefore, according to this embodiment, it is not necessary for the user to obtain a parameter to be set in the external setting section 102.

Note that the parameter control section 201 may set a fade value and a pan value in the external setting section 102, depending on the amplitude of an output of the combining section 104.

Also, the parameter control section 201 may be adapted to set only a fade value, depending on an output of the fade control section 103a, and a pan value may be set by the user. Alternatively, the parameter control section 201 may be adapted to set only a pan value, depending on an output of the pan control section 103b, and a fade value may be set by the user.

Embodiment 3 of the Invention

Figure 6:
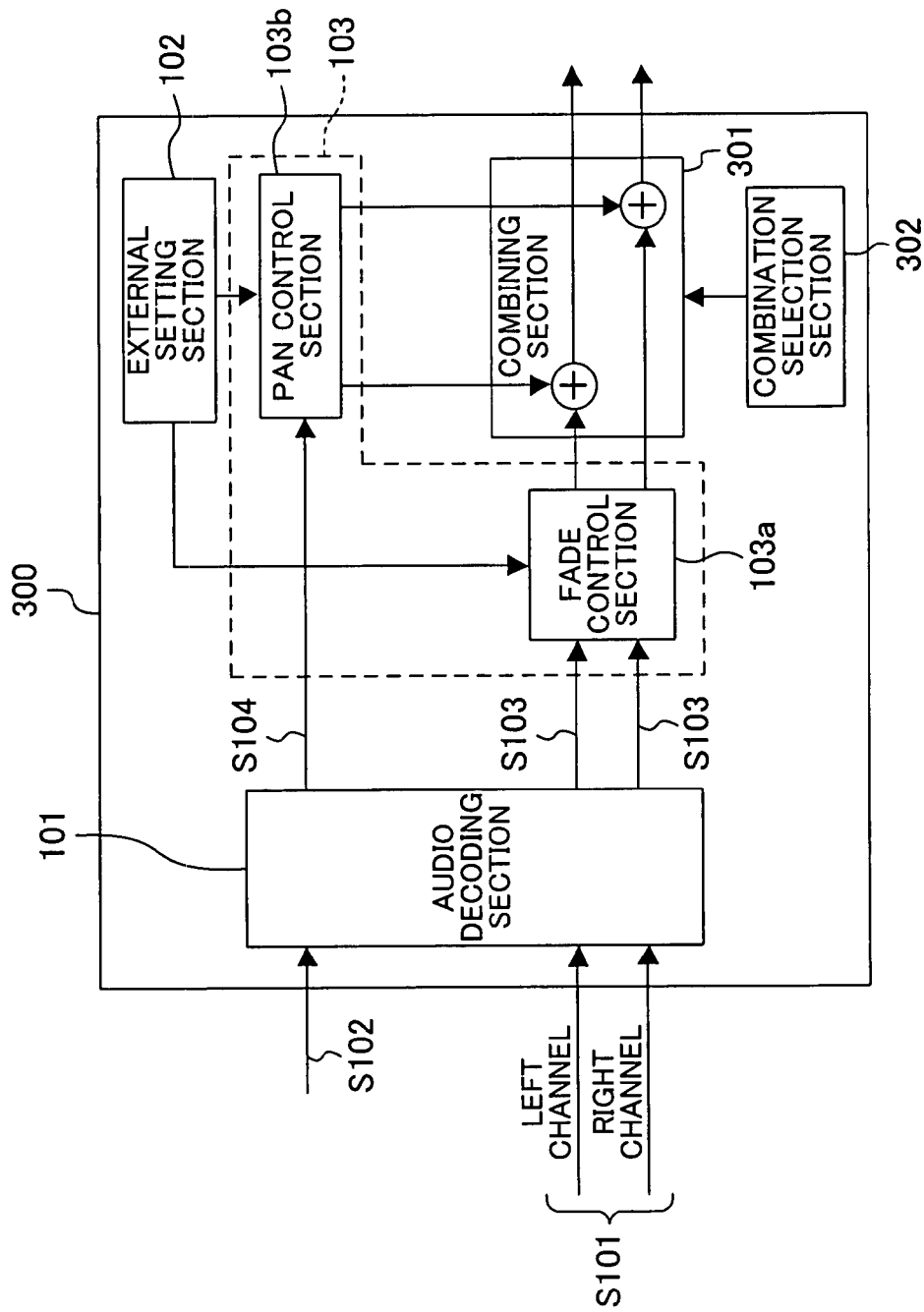
FIG. 6 is a block diagram showing a configuration of an audio decoding device 300 according to Embodiment 3 of the present invention.

FIG. 6 is a block diagram showing a configuration of an audio decoding device 300 according to Embodiment 3 of the present invention. As shown in FIG. 6, the audio decoding device 300 is obtained by replacing the combining section 104 with a combining section 301 and adding a combination selection section 302 to the audio decoding device 100.

The combining section 301 selectively outputs any one of a signal obtained by combining an output of the fade control section 103a and an output of the pan control section 103b, and an output signal of the fade control section 103a, depending on an input control signal (referred to as a combination control signal).

The combination selection section 302 receives an external instruction (e.g., an instruction from a listener), and outputs the combination control signal to the combining section 301 in response to the external instruction.

According to the audio decoding device 300, it is possible to determine whether or not to listen to auxiliary audio.

Embodiment 4

Figure 7:
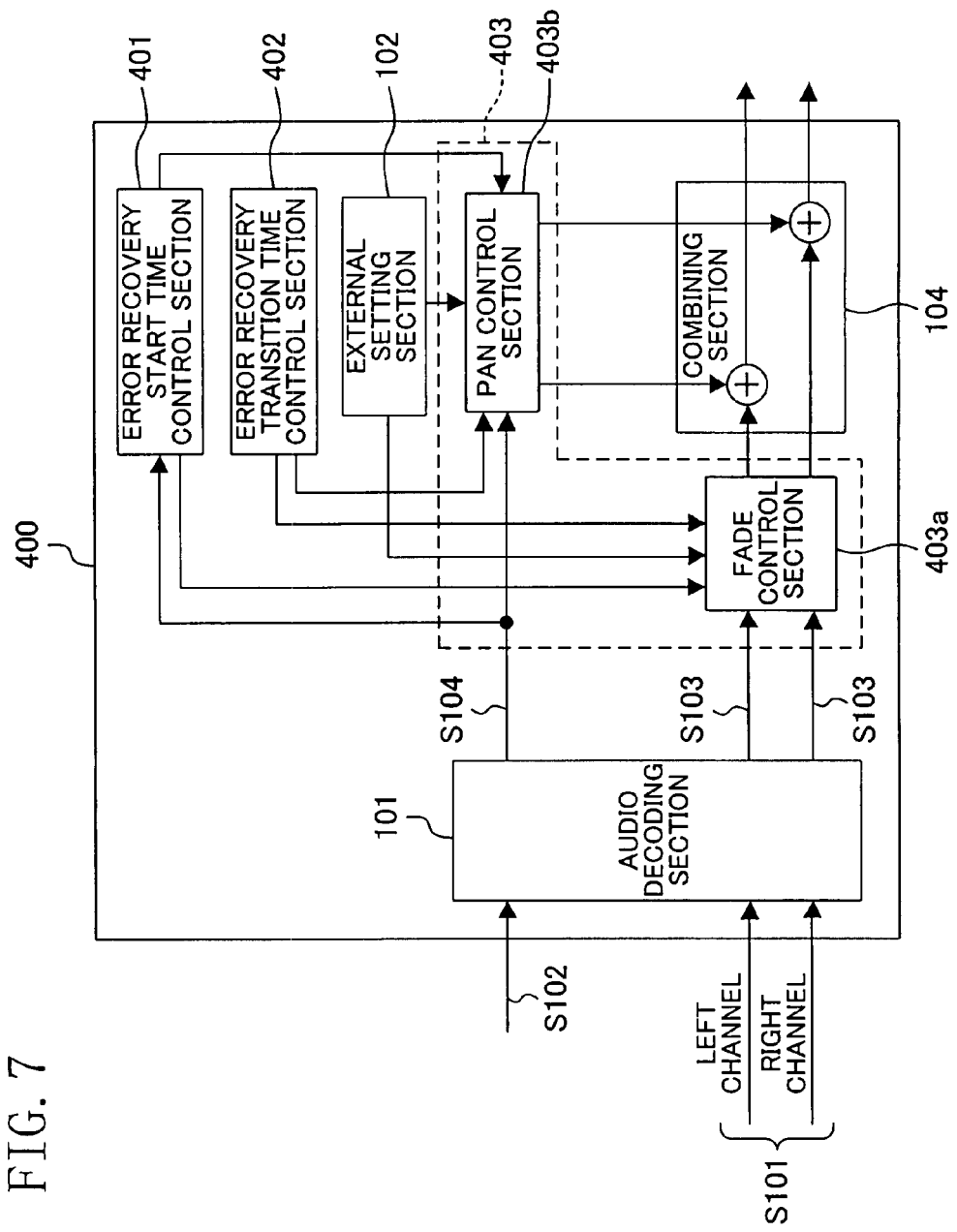
FIG. 7 is a block diagram showing a configuration of an audio decoding device 400 according to Embodiment 4 of the present invention.

FIG. 7 is a block diagram showing a configuration of an audio decoding device 400 according to Embodiment 4 of the present invention. As shown in FIG. 7, the audio decoding device 400 is obtained by providing an audio data processing section 403 instead of the audio data processing section 103 and adding an error recovery start time control section 401 and an error recovery transition time control section 402 to the audio decoding device 100.

The audio data processing section 403 comprises a fade control section 403a and a pan control section 403b, and processes main audio data and auxiliary audio data.

The fade control section 403a is adapted from the fade control section 103a so that timing of starting error recovery and a time required to transition from a current loudness to a loudness corresponding to a newly selected fade value (referred to as an error recovery transition time) can be changed, depending on an input predetermined control signal.

The pan control section 403b is adapted from the pan control section 103b so that timing of starting error recovery and a time required to transition from current sound localization to sound localization corresponding to a newly selected pan value (also referred to as an error recovery transition time) can be set, depending on an input predetermined control signal.

When an error state of at least one of the fade value and the pan value in the second decoded data S104 continues for a predetermined time or more, the error recovery start time control section 401 determines that start of error recovery is required, and instructs the fade control section 403a or the pan control section 403b which requires start of error recovery, to start error recovery.

The error recovery transition time control section 402 indicates the error recovery transition times with respect to the fade control section 403a and the pan control section 403b.

(Operation of Audio Decoding Device 400)

In the audio decoding device 400, if the error state of at least one of the fade value and the pan value in the second decoded data S104 continues for the predetermined time or more, the error recovery start time control section 401 instructs the fade control section 403a or the pan control section 403b which requires start of error recovery, to start error recovery. On the other hand, the error recovery transition time control section 402 indicates the error recovery transition times with respect to the fade control section 403a and the pan control section 403b.

Thereby, the fade control section 403a and the pan control section 403b control the loudness level or the sound localization in a stepwise manner from current states to states corresponding to a new parameter in the given error recovery transition time.

As described above, according to this embodiment, when the error state continues for the predetermined time or more, the control of the loudness or the sound localization is performed in a stepwise manner. Therefore, for example, it is possible to avoid a sudden change in the loudness or the like due to a sudden error.

Note that the error recovery start time control section 401 may count the number of errors occurring per unit time, and may instruct start of error recovery when the result exceeds a predetermined number. In some applications, the error recovery start time control section 401 may instruct start of error recovery as soon as an error is detected.

Also, the error recovery start time control section 401 is adapted to be able to execute each of these error recovery instructing methods (the instruction of error recovery based on the error continuation time, the instruction of error recovery based on the number of errors occurring per unit time, etc.), and change the error recovery instructing methods, depending on, for example, an environment where the audio decoding device 400 is used. Thereby, error recovery can be executed with the least sense of discomfort.

(Variation 1 of Embodiment 4 of the Invention)

Figure 8:
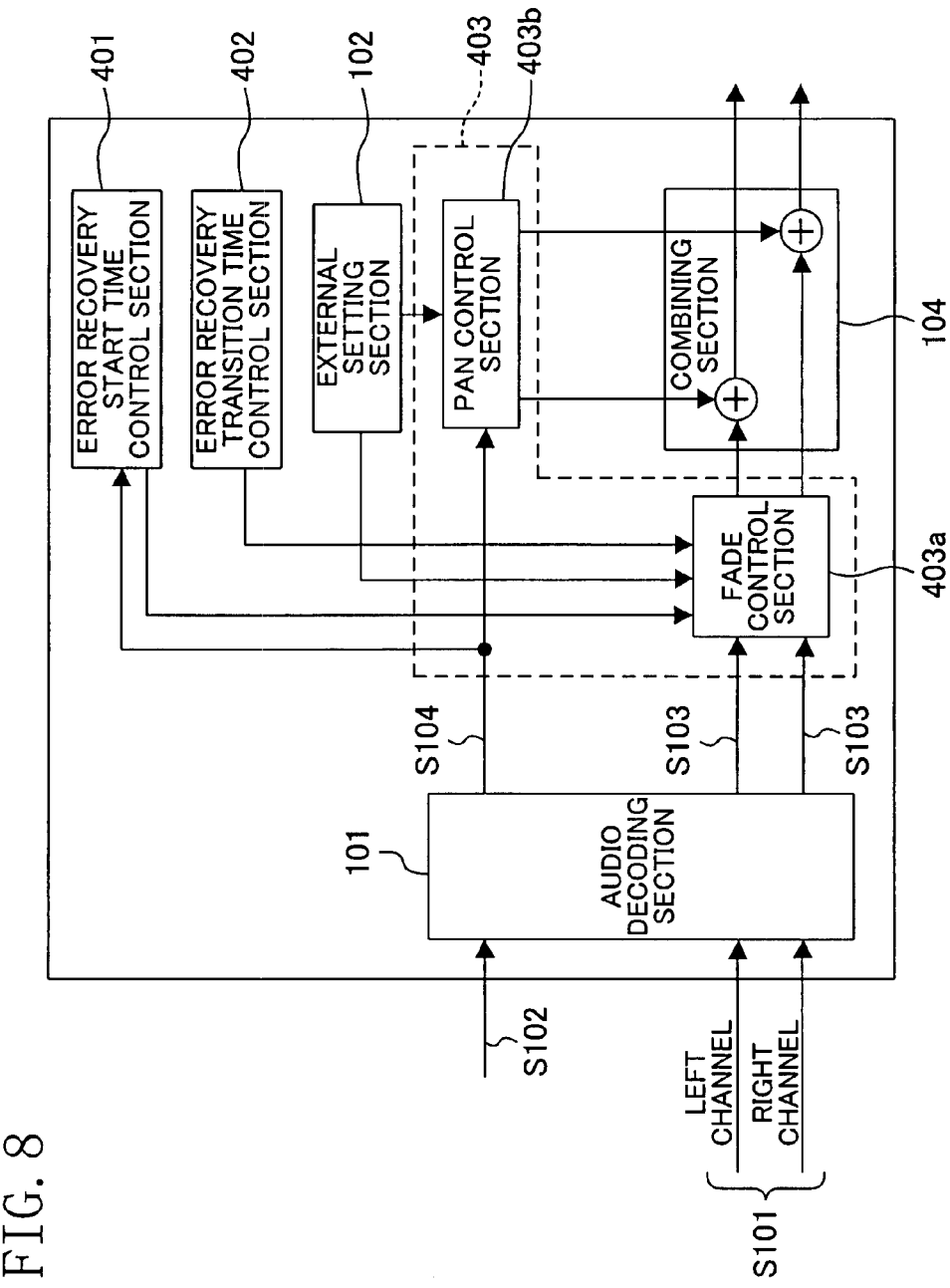
FIG. 8 is a block diagram showing a configuration of an audio decoding device according to Variation 1 of Embodiment 4 of the present invention.

FIG. 8 is a block diagram showing a configuration of an audio decoding device according to Variation 1 of Embodiment 4 of the present invention. In this audio decoding device, the error recovery timing and the error recovery transition time are controlled only in the fade control. The error recovery start timing of the pan control is controlled based on a flag set in the external setting section 102 as in the audio decoding device 100 or the like, and a time required for error recovery (error recovery transition time) is set to be a default value.

(Variation 2 of Embodiment 4 of the Invention)

Figure 9:
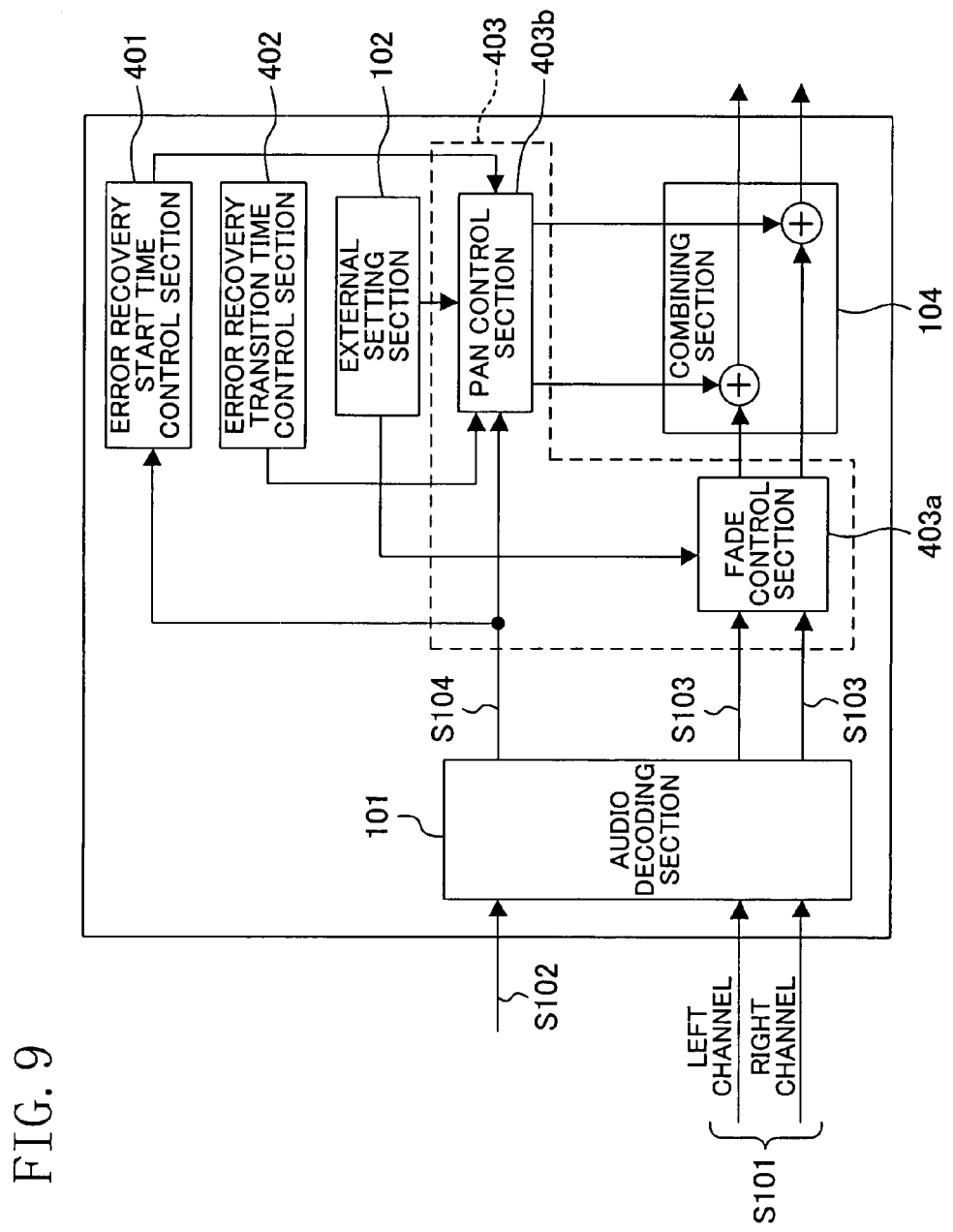
FIG. 9 is a block diagram showing a configuration of an audio decoding device according to Variation 2 of Embodiment 4 of the present invention.

FIG. 9 is a block diagram showing a configuration of an audio decoding device according to Variation 2 of Embodiment 4 of the present invention. In this audio decoding device, the error recovery timing and the error recovery transition time are controlled only in the pan control. The error recovery start timing of the fade control is controlled based on a flag set in the external setting section 102 as in the audio decoding device 100 or the like, and a time required for error recovery (error recovery transition time) is set to be a default value.

As described above, the audio decoding device of the present invention has the effect that data processing, such as loudness adjustment or the like, can be appropriately performed even when a data processing parameter contained in stream data has an inappropriate value, and is useful as, for example, an audio decoding device which decodes stream data containing encoded audio data.

What is claimed is:

1. An audio decoding device for decoding stream data containing encoded audio data, wherein the audio decoding device receives first stream data containing encoded data obtained by encoding first audio data, and second stream data containing encoded data obtained by encoding second audio data and a data processing parameter for processing the first audio data and the second audio data, the device comprising:

an audio decoding section for decoding the first stream data and the second stream data to generate the first and second audio data and the data processing parameter;

an external setting section in which a parameter corresponding to the data processing parameter is set;

an audio data processing section for processing the first and second audio data; and an error recovery start time control section for instructing the audio data processing section to start data processing when the data processing parameter generated by the audio decoding section continues to include an error for a predetermined time or more;

wherein the audio data processing section processes at least one of the first and second audio data using the parameter set in the external setting section when the data processing parameter contained in the second stream data includes an error, and using the data processing parameter generated by the audio decoding section when the data processing parameter contained in the second stream data includes no error, and wherein the audio data processing section is adapted to start data processing in response to an instruction from the error recovery start time control section.

2. The device of claim 1, further comprising:

an error recovery transition time control section for indicating a time from start to end of data processing with respect to the audio data processing section, wherein the audio data processing section is adapted to complete data processing in the time indicated by the error recovery transition time control section.

3. An audio decoding device for decoding stream data containing encoded audio data, wherein the audio decoding device receives first stream data containing encoded data obtained by encoding first audio data, and second stream data containing encoded data obtained by encoding second audio data and a data processing parameter for processing the first audio data and the second audio data, the device comprising:

an audio decoding section for decoding the first stream data and the second stream data to generate the first and second audio data and the data processing parameter;

an external setting section in which a parameter corresponding to the data processing parameter is set;

an audio data processing section for processing the first and second audio data; and an error recovery start time control section for instructing the audio data processing section to start data processing when the number of consecutive times where the data processing parameter generated by the audio decoding section is in error is more than or equal to a predetermined number, wherein the audio data processing section processes at least one of the first and second audio data using the parameter set in the external setting section when the data processing parameter contained in the second stream data includes an error, and using the data processing parameter generated by the audio decoding section when the data processing parameter contained in the second stream data includes no error, and wherein the audio data processing section is adapted to start data processing in response to an instruction from the error recovery start time control section.

4. The device of claim 3, further comprising:

an error recovery transition time control section for indicating a time from start to end of data processing with respect to the audio data processing section, wherein the audio data processing section is adapted to complete data processing in the time indicated by the error recovery transition time control section.

5. An audio decoding device for decoding stream data containing encoded audio data, wherein the audio decoding device receives first stream data containing encoded data obtained by encoding first audio data, and second stream data containing encoded data obtained by encoding second audio data and a data processing parameter for processing the first audio data and the second audio data, the device comprising:

an audio decoding section for decoding the first stream data and the second stream data to generate the first and second audio data and the data processing parameter;

an external setting section in which a parameter corresponding to the data processing parameter is set;

an audio data processing section for processing the first and second audio data; and an error recovery start time control section for selecting any one of a first error recovery instructing method for instructing the audio data processing section to start data processing when the data processing parameter generated by the audio decoding section continues to include an error for a predetermined time or more, and a second error recovery instructing method for instructing the audio data processing section to start data processing when the number of consecutive times where the data processing parameter generated by the audio decoding section is in error is more than or equal to a predetermined number, and instructing the audio data processing section to start data processing using the selected error recovery instructing method, wherein the audio data processing section processes at least one of the first and second audio data using the parameter set in the external setting section when the data processing parameter contained in the second stream data includes an error, and using the data processing parameter generated by the audio decoding section when the data processing parameter contained in the second stream data includes no error, and wherein the audio data processing section is adapted to start data processing in response to an instruction from the error recovery start time control section.

6. The device of claim 5, further comprising:

an error recovery transition time control section for indicating a time from start to end of data processing with respect to the audio data processing section, wherein the audio data processing section is adapted to complete data processing in the time indicated by the error recovery transition time control section.

* * * * *